US006386449B1

(12) United States Patent
Signoretto

(10) Patent No.: US 6,386,449 B1
(45) Date of Patent: May 14, 2002

(54) AUTOMATIC TERMINAL DISTRIBUTOR FOR READING AND MEMORIZING PRODUCTION DATA IN SALES OUTLETS IN GENERAL

(75) Inventor: Roberto Signoretto, Olmo di Martellago (IT)

(73) Assignee: Datalogic S.p.A., Bologna (IT)

( * ) Notice: Subject to any disclaimer, the term of this patent is extended or adjusted under 35 U.S.C. 154(b) by 0 days.

(21) Appl. No.: 09/369,930

(22) Filed: Aug. 9, 1999

Related U.S. Application Data

(63) Continuation of application No. PCT/EP98/00702, filed on Feb. 9, 1998.

(30) Foreign Application Priority Data

Feb. 10, 1997 (IT) ........................................ VE97A0006

(51) Int. Cl.[7] .................................................. G06K 5/10

(52) U.S. Cl. ....................................... 235/383; 235/375

(58) Field of Search ................................ 235/383, 385, 235/375

(56) References Cited

U.S. PATENT DOCUMENTS

| | | | | |
|---|---|---|---|---|
| 2,875,878 A | | 3/1959 | Fairfield | |
| 4,458,802 A | | 7/1984 | Maciver | |
| 5,047,614 A | * | 9/1991 | Bianco | 235/385 |
| 5,457,307 A | * | 10/1995 | Dumont | 235/383 |
| 5,468,942 A | | 11/1995 | Oosterveen et al. | |
| 5,918,211 A | * | 6/1999 | Sloane | 705/16 |
| 6,084,528 A | * | 7/2000 | Beach et al. | 340/825.35 |
| 6,142,373 A | * | 11/2000 | Claassen | 235/383 |

FOREIGN PATENT DOCUMENTS

| | | |
|---|---|---|
| EP | 0 749 101 | 12/1996 |
| FR | 2 717 932 | 9/1995 |
| WO | 96 05758 | 2/1996 |

* cited by examiner

*Primary Examiner*—Mark Tremblay
(74) *Attorney, Agent, or Firm*—Nixon & Vanderhye P.C.

(57) ABSTRACT

An automatic terminal distributor for reading and memorizing product data in sales outlets in general, characterized by comprising: a container (2) provided internally with a plurality of compartments (8) for a corresponding plurality of terminals (38) for reading the bar code printed on product packages, the terminals being provided with units for memorizing the data; moving means (12) for the compartments (8) within the container (2); means (24) for identifying the users of the sales outlets; a control unit (20) which controls the compartment moving means (12) in such a manner as to cause a selected one of the compartments (8) to face at least one door (18) provided on the container, the control unit causing the door to open when the significant user data have been recognized.

21 Claims, 4 Drawing Sheets

AUTOMATIC TERMINAL DISTRIBUTOR FOR READING AND MEMORIZING PRODUCTION DATA IN SALES OUTLETS IN GENERAL

This is a continuation of PCT application No. PCT/EP98/00702, filed Feb. 9, 1998, the entire content of which is hereby incorporated by reference in this application.

BACKGROUND OF THE INVENTION

1. Field of the Invention

This invention relates to an automatic terminal distributor for reading and memorizing product data in sales outlets in general.

2. Discussion of Prior Art

In sales outlets in general, such as supermarkets, multiple stores and shops using the self-service system, the client takes his purchases directly from the various shelves on which they are displayed, he places them in a trolley or basket, and finally he presents them to a check-out where the operator checks the taken products one by one, passes them in front of an optical reader, for example of laser type, to read the bar code present on the product, and feeds the relative cost into the cash register.

A drawback of this sales system is the inevitable presence of long queues at the check-out, especially at particular times such as when approaching closure.

To eliminate this drawback it has been proposed to provide each supermarket customer, or a particular category of customer, with a laser reader terminal provided with a memory unit. In this manner, after taking the product from the shelf, the customer reads the bar code on the package with the terminal, so memorizing it. When the customer is ready to leave the supermarket, by which time the terminal has memorized all the purchases for that customer, the customer hands the terminal to the check-out operator, who by means of a suitable device reads the total cost from the terminal, so avoiding the need to read the individual products.

Such terminals are generally contained in a cabinet formed from various compartments arranged horizontally and vertically, each being provided with an access door and a locking device against unauthorized withdrawal; a system of this kind is disclosed in U.S. Pat. No. 5,468,942.

Such cabinets have however certain drawbacks, and in particular:

- a large overall size which consumes excessive display and floor space,
- a certain constructional complexity, by virtue of the large number of compartments, doors and anti-theft devices,
- a considerable time loss for the user in finding the compartment containing the terminal assigned to him.

SUMMARY OF THE INVENTION

These drawbacks are eliminated according to the invention by an automatic terminal distributor for reading and memorizing data in sales outlets in general, as described in claim 1.

BRIEF DESCRIPTION OF THE DRAWINGS

A preferred embodiment of the invention is described in detail hereinafter with reference to the accompanying drawings, on which.

DETAILED DISCUSSION OF PREFERRED EMBODIMENTS

Figure 1:
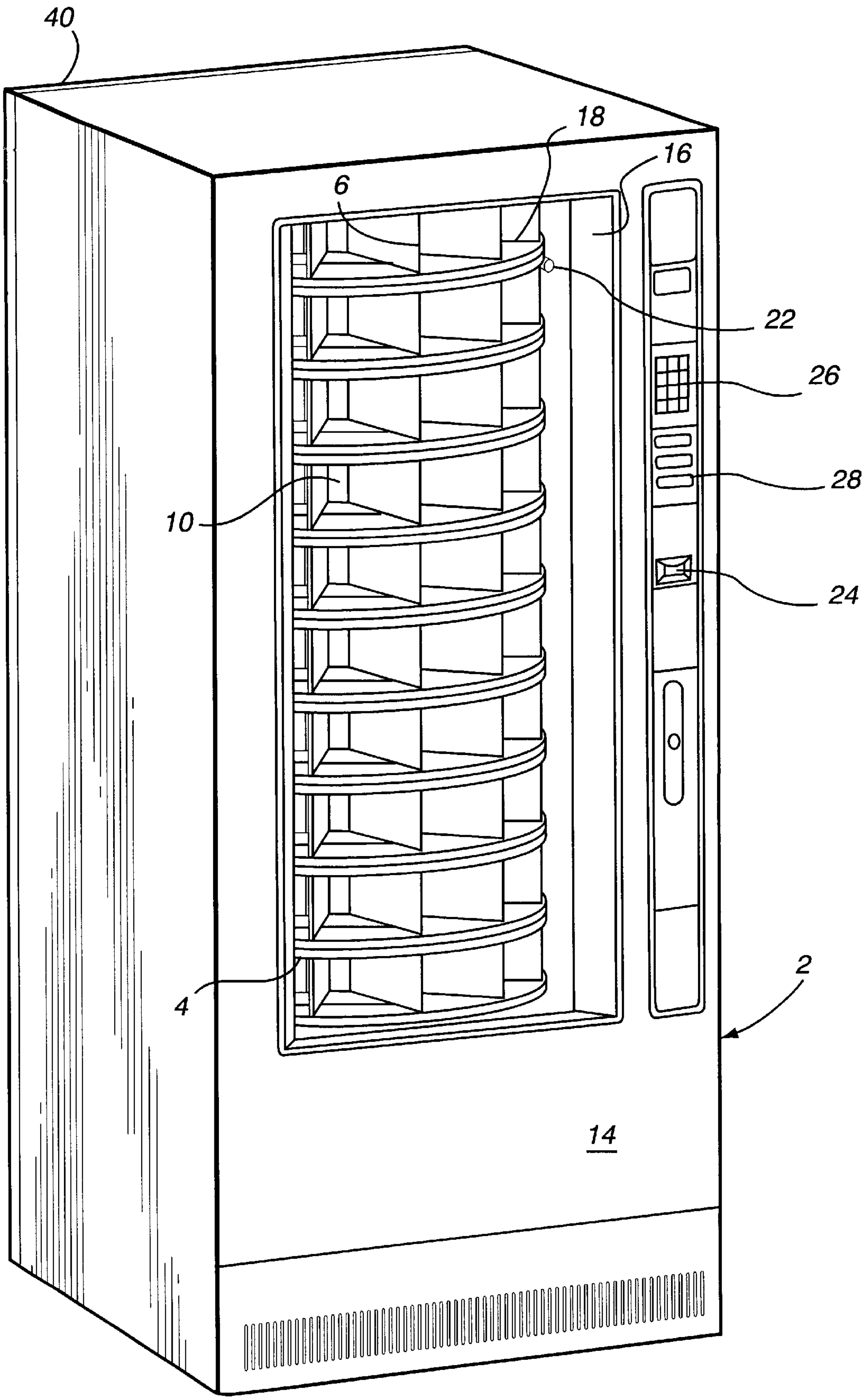
FIG. 1 is a perspective view of a distributor according to the invention.
Figure 2:
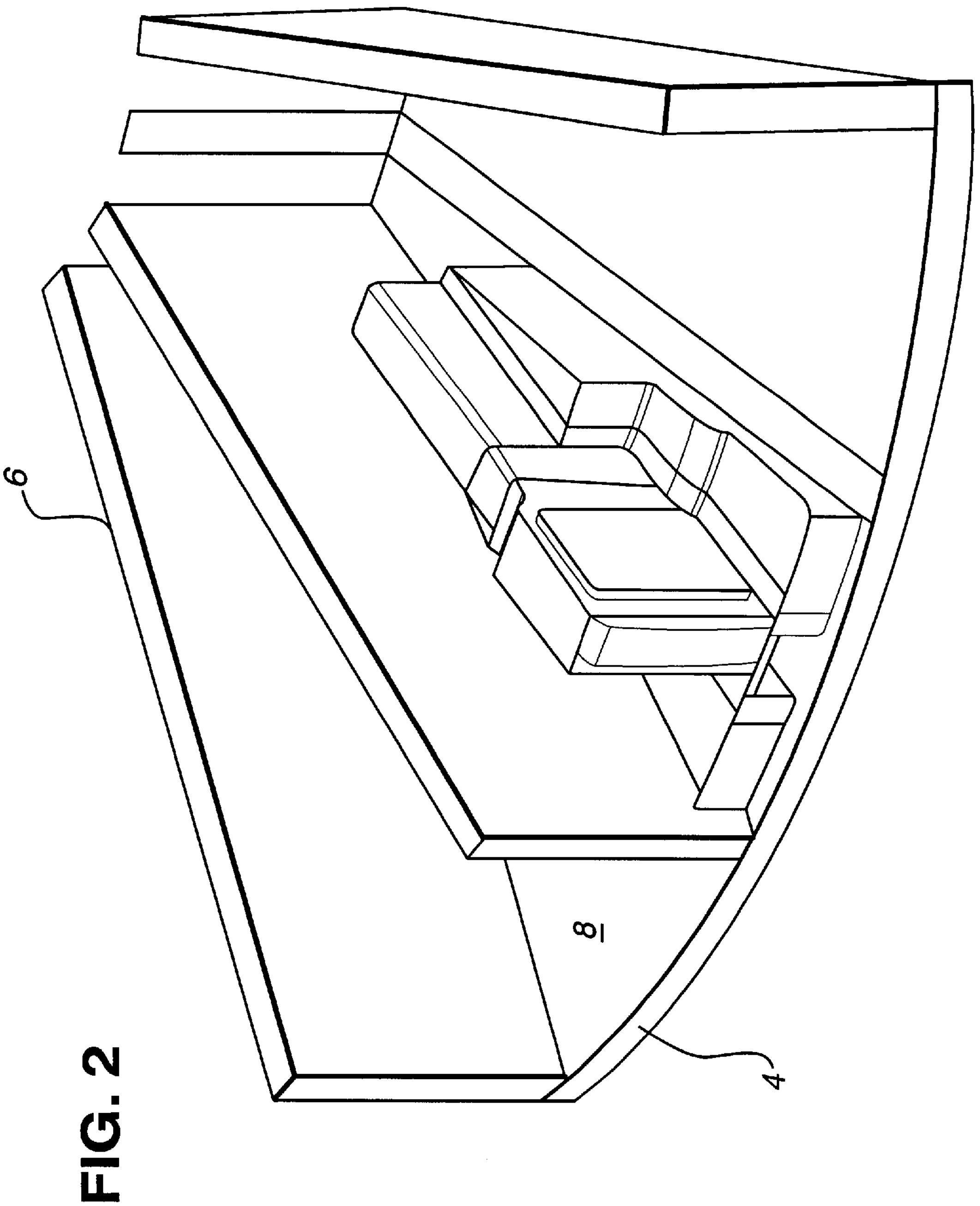
FIG. 2 is a perspective view of a shelf of the distributor.
Figure 3:
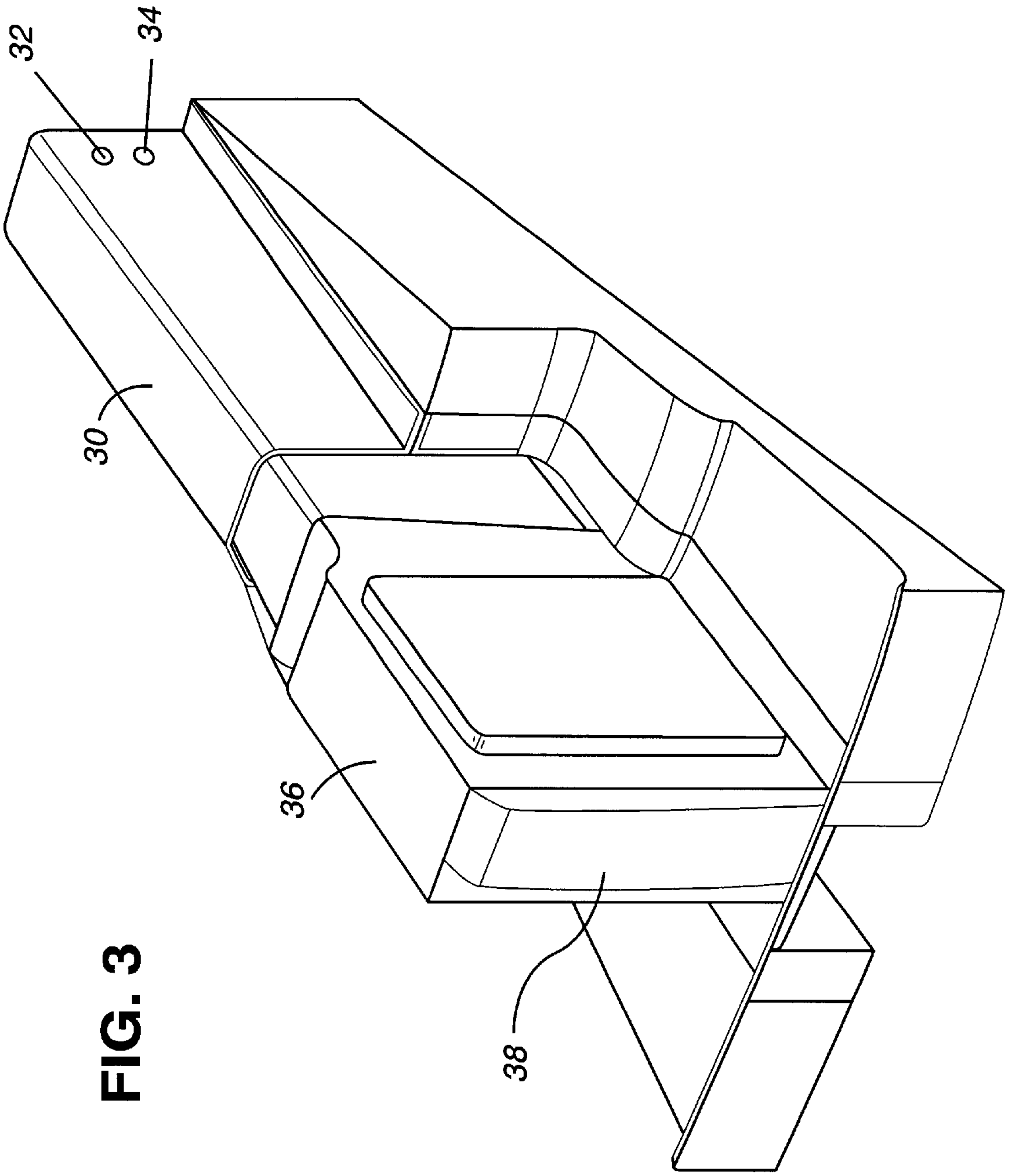
FIG. 3 shows a terminal inserted into the compartment on the shelf.
Figure 4:
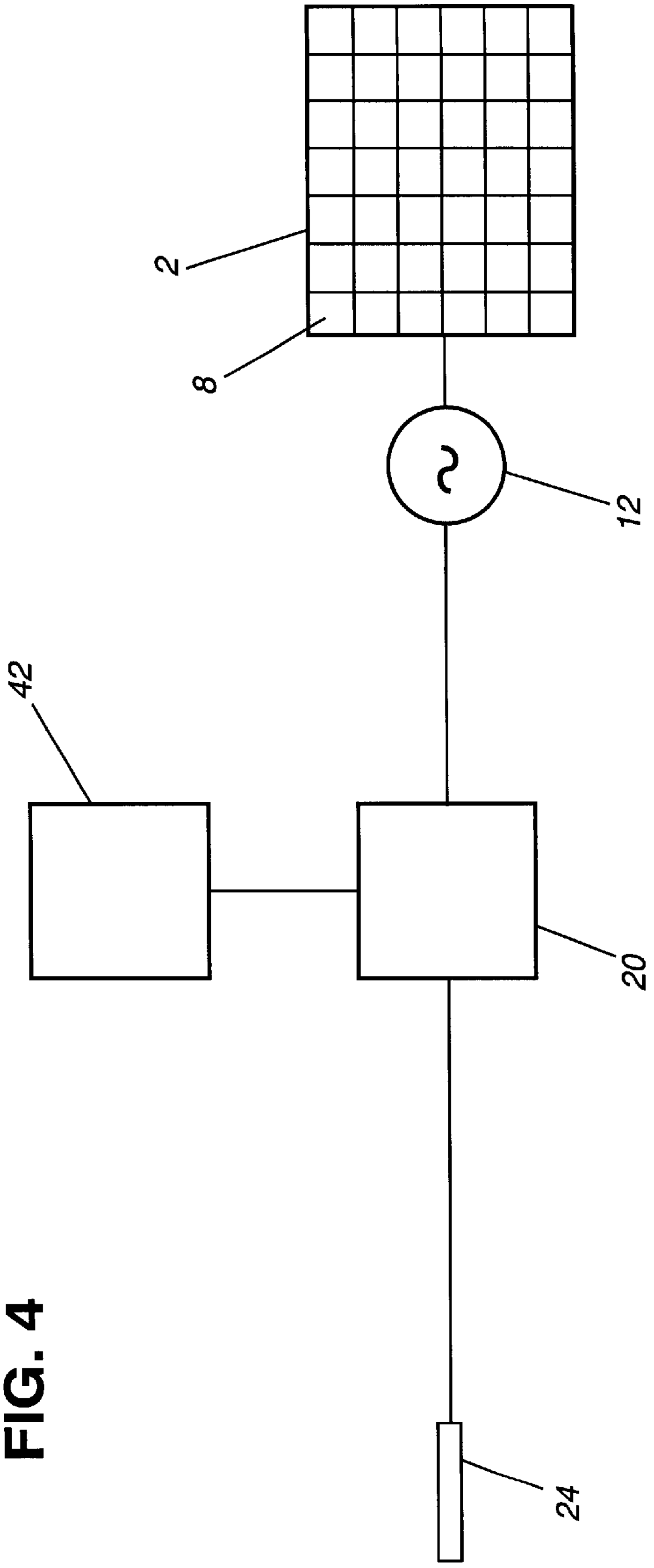
FIG. 4 shows a block diagram relative to its operation.

As can be seen from the figures, the automatic distributor of the invention comprises substantially a parallelepiped container 2 internally housing a plurality of overlying discs or shelves 4 comprising a plurality of radial baffles 6 defining compartments 8.

The shelves 4 are rigid with a vertical shaft 10 rotated by an electric motor 12.

The front surface 14 of the distributor is provided with a transparent screen 16 enabling the compartments 8 to be observed from the outside. In correspondence with one of the edges of each shelf 4, the screen is provided with a door 18 openable under the control of a control unit 20 which also controls the rotation of a motor 12.

An LED 22 is provided to the side of each door, on the surface 14 there being mounted a magnetic card reader 24, an alphanumeric keypad 26 and a display unit 28.

On each compartment there is mounted a slightly inclined support 30 provided with two connectors 32, 34 connected to a power supply and to the control unit 20 respectively.

The dimensions of said support are such as to enable it to receive by insertion a terminal 36 provided with a bar code reader 38, an internal unit for memorizing the data read, and rechargeable internal batteries.

Each terminal is also provided with corresponding connectors for engagement with the connectors 32,34 provided on the support 30.

The automatic distributor of the invention is also provided with a rear door 40 for reinserting the terminals into the container.

The automatic distributor of the invention is used in the following manner:

when a customer enters the supermarket he inserts his recognition card into the appropriate slot of the card reader 24. After the control unit has verified the customer's data from the files of a host computer 42 connected to the control unit, the display unit displays the card status and, if the verification is positive, the control unit activates an LED 22 to identify the shelf 4 to be used, and releases the door 18 to enable the customer to withdraw from the facing compartment 8 the terminal 36 contained in it.

If the verification is negative, in the sense of a card which is unidentifiable, a card pertaining to a customer with insufficient funds, or machine malfunction, the control unit displays this fact on the display unit. At this stage, data can be fed in via the keypad 26.

After the terminal has been withdrawn and the door closed, the control unit 20 rotates the motor 12 so that a further compartment 8 with a terminal contained in it faces the door.

The customer now makes his various purchases within the supermarket by taking the products and reading the bar code printed on their packages using the laser reader, to hence memorize the purchased product.

Having terminated his shopping, the customer hands the terminal to the check-out personnel for insertion into an appropriate unit which transfers the data to the cash register.

Every so often, a shop assistant opens the rear door 40 and inserts the various terminals into their supports for recharging their batteries and making them available to customers.

While the terminals are being inserted from the rear, the customers can still withdraw them from the container.

From the aforegoing it is apparent that the automatic distributor of the invention offers numerous advantages, and in particular:

- it is of smaller overall size than previously used compartmentalized cabinets,
- it enables terminal distributor to be controlled,
- it enables the terminal batteries to be recharged when not in use,
- it directs the user to withdraw one determined terminal,
- it enables the terminal to be easily and quickly withdrawn, given the small size of the cabinet.

What is claimed is:

1. An automatic distributor of terminals, said terminals for reading product data in sales outlets, comprising:

- a container (2),
- a plurality of movable compartments (8) in the container for storing a corresponding plurality of said terminals (36), each compartment (8) being provided with a terminal support element (30) comprising connectors cooperating with connectors provided on the terminals (36),
- means (24) for identifying the users of the sales outlets,
- a control unit (20);
- a plurality of releasable doors (18) providing access to at least one of said plurality of compartments;
- means for moving the compartments (8) so that a selected one of the compartments (8) can be brought in correspondence with a selected one of said doors (18) to be released;
- means for indicating the released door (18) to the customer; and
- a service door for reinserting the terminals into the compartments.

2. An automatic distributor as claimed in claim 1, wherein the container is of substantially parallelepiped form and houses a plurality of superposed discs (4), each comprising radial baffles (6) which define the compartments (8) on the discs (4).

3. An automatic distributor as claimed in claim 1, wherein each disc (4) is associated with a respective one of the doors (18).

4. An automatic distributor as claimed in claim 1, wherein the means for indicating the released door (18) to the customer comprise an LED (22).

5. An automatic distributor as claimed in claim 1, wherein the container includes an alphanumeric keypad (26) and a display unit (28).

6. An automatic distributor of terminals, said terminals for reading product data in sales outlets, comprising:

- a container (2),
- a plurality of movable compartments (8) in the container for storing a corresponding plurality of said terminals (36), each compartment (8) being provided with a terminal support element (30) comprising connectors cooperating with connectors provided on the terminals (36),
- means (24) for identifying the users of the sales outlets,
- a control unit (20);
- a plurality of releasable doors (18) providing access to at least one of said plurality of compartments;
- means for moving the compartments (8) so that a selected one of the compartments (8) can be brought in correspondence with a selected one of said doors (18) to be released;
- means for indicating the released door (18) to the customer; and
- a rear door (40) for reinserting the terminals into the compartments.

7. An automatic distributor as claimed in claim 1, wherein the control unit is connected to a host computer which memorizes the names of the customers of the sales outlet.

8. An automatic distributor as claimed in claim 1, wherein the terminals are provided with internal batteries rechargeable via the connectors (32).

9. A method for storage of terminals in a sales outlet and automatic distribution of said terminals to customers, said terminals for enabling the customers to read product data printed on products they are purchasing, comprising the steps of:

- storing the terminals in a terminal distributor comprising a container (2) provided internally with a first plurality of movable compartments (8), each compartment housing a corresponding terminal (36), and access to said terminals being provided by a plurality of releasable doors,
- locating the terminals (36) in the compartments (8) connected to a control unit (20) of the container (2) to exchange data therebetween,
- identifying the customer by verifying customer's data,
- assigning a stored terminal (36) to an identified customer,
- having the compartment (8) with the assigned terminal (36) in correspondence with a selected one of said doors (18);
- releasing the selected door (18);
- indicating the released door (18) to the customer; and
- repositioning the terminals into the container after use through a service door of the container without interrupting delivery of terminals through said selected door.

10. A method according to claim 9, wherein the step of indicating the released door (18) comprises activating an LED (22).

11. A method according to claim 9, wherein the compartments (8) are provided on a plurality of overlying rotating discs (4), the plurality of discs (4) being correspondent to the plurality of doors (18) so that a door (18) is provided at each disc (4), the movement of the compartments comprising the step of rotating the discs (4).

12. A method according to claim 9, wherein the step of identifying the customer comprises the step of having the customer insert a recognition card into a card reader (24) of the container (2) and/or input data to the control unit (20) by means of a keypad (26) on the container (2).

13. A method for storage of terminals in a sales outlet and automatic distribution of said terminals to customers, said terminals for enabling the customers to read product data printed on products they are purchasing, comprising the steps of:

storing the terminals in a terminal distributor comprising a container (2) provided internally with a first plurality of movable compartments (8), each compartment housing a corresponding terminal (36), and access to said terminals being provided by a plurality of releasable doors, locating the terminals (36) in the compartments (8) connected to a control unit (20) of the container (2) to exchange data therebetween, identifying the customer by verifying customer's data, assigning a stored terminal (36) to an identified customer, having the compartment (8) with the assigned terminal (36) in correspondence with a selected one of said doors (18);

releasing the selected door (18);

indicating the released door (18) to the customer; and repositioning the terminals (36) into the container (2) after use through a rear door (40) of the container (2), without interrupting the possibility of delivering terminals (36) through the releasable doors (18).

14. A method according to claim 9, comprising the step of recharging internal batteries of the terminals (36) when the terminals (36) are in the compartments (8).

15. A method according to claim 9, wherein the step of having the compartment (8) with the assigned terminal (36) in correspondence with a selected one of said doors (18) comprises the step of moving the compartments (8).

16. A method according to claim 15, wherein the step of moving the compartments (8) is performed after the step of assigning a stored terminal (36) to an identified customer.

17. A method according to claim 15, wherein the step of moving the compartments (8) is performed before the step of assigning a stored terminal (36) to an identified customer.

18. An automatic distributor of terminals, said terminals for reading product data in sales outlets, comprising:

a container (2), a plurality of movable compartments (8) in the container for storing a corresponding plurality of said terminals (36), each compartment (8) being provided with a terminal support element (30) comprising connectors cooperating with connectors provided on the terminals (36), a card reader (24) for identifying the users of the sales outlets, a control unit (20);

a plurality of releasable doors (18) providing access to at least one of said plurality of compartments;

a motor (12) for moving the compartments (8) so that a selected one of the compartments (8) can be brought in correspondence with a selected one of said doors (18) to be released;

a display for indicating the released door (18) to the customer; and a service door for reinserting the terminals into the compartment.

19. An automatic distributor of terminals, said terminals for reading product data in sales outlets, said distributor comprising:

a container (2) of substantially parallelepiped form, said container including and housing a plurality of superposed discs (4), each disk including radial baffles (6) which define a plurality of movable compartments (8) on the discs (4), said container including an alphanumeric keypad (26) and a display unit (28), said container including a rear door (40) for reinserting said terminals into the compartments;

said movable compartments (8) in the container for storing a corresponding plurality of said terminals (36), each compartment (8) being provided with a terminal support element (30) comprising connectors cooperating with connectors (32) provided on the terminals (36) wherein the terminals are provided with internal batteries rechargeable via the connectors (32);

a card reader (24) for identifying the users of the sales outlets;

a control unit (20) connected to a host computer which memorizes the names of said users of the sales outlet;

a plurality of releasable doors (18) providing access to at least one of said plurality of compartments, each disc (4) is associated with a respective one of the doors (18);

a motor (12) for moving the compartments (8) so that a selected one of the compartments (8) can be brought in correspondence with a selected one of said doors (18) to be released;

an LED indicator (22) is provided for indicating the released door (18) to the customer; and a service door for reinserting the terminals into the compartment.

20. A method for storage of terminals in a sales outlet and automatic distribution of them to customers, for enabling the customers to read data of products they are purchasing, said method comprising the steps of:

storing the terminals in a terminal distributor comprising a container (2) provided internally with a plurality of movable compartments (8), each compartment housing a corresponding terminal (36), and access to said terminals being provided by a plurality of releasable doors, wherein the compartments (8) are provided on a plurality of overlying rotating discs (4), the plurality of discs (4) being correspondent to a plurality of doors (18) so that a door (18) is provided at each disc (4) and movement of the compartments comprising the step of rotating the discs (4);

locating the terminals (36) in the compartments (8) connected to a control unit (20) of the container (2) to exchange data therebetween;

recharging internal batteries of the terminals (36) when the terminals (36) are in the compartments (8);

identifying the customer by verifying customer's data by having the customer insert a recognition card into a card reader (24) of the container (2) and/or input data to the control unit (20) by means of a keypad (26) on the container (2);

assigning a stored terminal (36) to an identified customer;

moving the compartment (8) with the assigned terminal (36) in correspondence with a selected one of said doors (18);

releasing the selected door (18);

indicating the released door (18) to the identified customer by activating an LED (22); and repositioning the terminals (36) into the container (2) after use through a rear door (40) of the container (2), without interrupting the possibility of delivering terminals (36) through the releasable doors (18).

21. A method for storage of terminals in a sales outlet and automatic distribution of them to customers, for enabling the customers to read data of products they are purchasing, said method comprising the steps of:

storing the terminals in a terminal distributor comprising a container (2) provided internally with a plurality of movable compartments (8), each compartment housing a corresponding terminal (36), and access to said terminals being provided by a plurality of releasable doors, wherein the compartments (8) are provided on a plurality of overlying rotating discs (4), the plurality of discs (4) being correspondent to a plurality of doors (18) so that a door (18) is provided at each disc (4) and movement of the compartments comprising the step of rotating the discs (4);

locating the terminals (36) in the compartments (8) connected to a control unit (20) of the container (2) to exchange data therebetween;

recharging internal batteries of the terminals (36) when the terminals (36) are in the compartments (8)

identifying the customer by verifying customer's data by having the customer insert a recognition card into a card reader (24) of the container (2) and/or input data to the control unit (20) by means of a keypad (26) on the container (2);

moving a compartment (8) with a terminal (36) into correspondence with a selected one of said doors (18);

assigning said terminal (36) in correspondence with said selected door to an identified customer;

releasing the selected door (18);

indicating the released door (18) to the identified customer by activating an LED (22); and repositioning the terminals (36) into the container (2) after use through a rear door (40) of the container (2), without interrupting the possibility of delivering terminals (36) through the releasable doors (18).

* * * * *